(12) United States Patent
Ducheneaut et al.

(10) Patent No.: US 7,836,001 B2
(45) Date of Patent: Nov. 16, 2010

(54) RECOMMENDER SYSTEM WITH AD-HOC, DYNAMIC MODEL COMPOSITION

(75) Inventors: Nicolas B. Ducheneaut, Sunnyvale, CA (US); Kurt E. Partridge, Palo Alto, CA (US); James M. A. Begole, San Jose, CA (US); Robert R. Price, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 593 days.

(21) Appl. No.: 11/855,547

(22) Filed: Sep. 14, 2007

(65) Prior Publication Data
US 2009/0076997 A1 Mar. 19, 2009

(51) Int. Cl.
*G06F 17/00* (2006.01)
*G06N 5/00* (2006.01)
*G06N 5/02* (2006.01)

(52) U.S. Cl. .............................. 706/45; 706/46; 706/47
(58) Field of Classification Search ..................... 706/45
See application file for complete search history.

(56) References Cited

U.S. PATENT DOCUMENTS

| | | | | |
|---|---|---|---|---|
| 7,092,929 B1 * | 8/2006 | Dvorak et al. | ................. | 705/28 |
| 7,373,325 B1 * | 5/2008 | Hadingham et al. | ........... | 705/37 |
| 7,640,224 B2 * | 12/2009 | Rish et al. | ..................... | 706/47 |
| 7,672,865 B2 * | 3/2010 | Kumar et al. | ................. | 705/10 |
| 7,676,034 B1 * | 3/2010 | Wu et al. | ............... | 379/265.01 |
| 7,698,170 B1 * | 4/2010 | Darr et al. | ...................... | 705/26 |
| 7,720,720 B1 * | 5/2010 | Sharma et al. | ................. | 705/26 |
| 7,743,067 B2 * | 6/2010 | Ducheneaut et al. | ........ | 707/769 |
| 7,769,600 B2 * | 8/2010 | Iliff | ............................... | 705/2 |
| 2007/0094066 A1 * | 4/2007 | Kumar et al. | .................. | 705/10 |

OTHER PUBLICATIONS

An Influence Diagram for Maintenance Strategy Decision Making, Zhiqiang Cai; Shudong Sun; Shubin Si; Yannou, B.; Intelligent Systems and Applications, 2009. ISA 2009. International Workshop on Digital Object Identifier: 10.1109/IWISA.2009.5072721 Publication Year: 2009, pp. 1-4.*

(Continued)

*Primary Examiner*—Michael Holmes
(74) *Attorney, Agent, or Firm*—Park, Vaughan, Fleming & Dowler LLP; Shun Yao

(57) ABSTRACT

One embodiment of the present invention provides recommender system for generating a recommendation of an item by combining a set of utility models adaptively to facilitate a decision-making process. The system includes a utility model database containing the set of utility models and a query module for receiving at least one query about the item from a querying entity. The system also includes a rule engine to specify a subset of utility models to be applied to the item and to specify a weight function of the specified utility models. Further included in the system is a set generator coupled to the utility model database, the query module, and the rule engine. The set generator computes a set of ratings by applying each of the utility model in the subset to the item and generates an overall rating for the item based on the weight function. The system further a communication module to return the overall rating.

21 Claims, 3 Drawing Sheets

OTHER PUBLICATIONS

A User-Adaptive Self-Proclamative Multi-Agent Based Recommendation System Design for E-Learning Digital Libraries Ponnusamy, R.; Gopal, T.V.; Cybernetics and Intelligent Systems, 2006 IEEE Conference on Digital Object Identifier: 10.1109/ICCIS.2006. 252279 Publication Year: 2006, pp. 1-7.*

Statement in Accordance with the Notice from the European Patent Office dated Oct. 1, 2007 Concerning Business Methods- EPC, pp. 592-593, XP002456252, ISSN: 0170-929.

* cited by examiner

RECOMMENDER SYSTEM WITH AD-HOC, DYNAMIC MODEL COMPOSITION

BACKGROUND

1. Field of the Invention

The present disclosure relates to a recommender system. More specifically, the present disclosure relates to a comprehensive recommender system that facilitates ad-hoc, dynamic model composition to recommend one or more items.

2. Related Art

An important aspect of an individual's decision-making process is the acceptance of recommendations from reliable sources. In decades past, such recommendations were generated and received by way of word of mouth, consumer surveys, or reviews in newspapers, magazines, or on the Internet. As technology has advanced drastically, so have the methods for receiving recommendations. Today, a major provider of recommendations is the computer-based "recommender system" which generates a recommendation after a user submits a query indicating the type of recommendation, such as a person, place, object, abstract idea, etc., that he is interested in.

A recommender system provides a user with personalized suggestions that facilitate his decision making. These individualized recommendations allow the user to rely on the recommender system when performing a wide variety of tasks, from purchasing a book, to renting a movie, and even to choosing a school.

SUMMARY

One embodiment of the present invention provides recommender system for generating a recommendation of an item by combining a set of utility models adaptively to facilitate a decision-making process. The system includes a utility model database containing the set of utility models and a query module for receiving at least one query about the item from a querying entity. The system also includes a rule engine to specify a subset of utility models to be applied to the item and to specify a weight function of the specified utility models. Further included in the system is a set generator coupled to the utility model database, the query module, and the rule engine. The set generator computes a set of ratings by applying each of the utility model in the subset to the item and generates an overall rating for the item based on the weight function. The system further a communication module to return the overall rating.

In a variation of this embodiment, the rule engine includes a user context module to receive contextual and/or preferential information associated with the querying entity.

In a further variation the contextual information includes at least one of: a current time of day; a current weather condition; a location associated with the querying entity; a movement associated with the querying entity; a calendar entry reflecting a user's past, current, and/or future schedule; a set of messaging data comprised of text extracted from, among others, emails and/or instant messages, where one or more users discuss interests and/or plans; and a reading history which involves content extracted from web pages or other sources a user has accessed, which content reflects the user's interests and/or tastes.

In a variation of this embodiment, the rule engine selects the subset of utility models based on the contextual and/or preferential information received by the user context module.

In a variation of this embodiment, the rule engine associates a decision made by the querying entity with the weight function to adjust the weight function adaptively.

In a variation of this embodiment, the weight function of the specified utility models is constructed by employing a heuristic approach.

In a variation of this embodiment, the weight function of the specified utility models is constructed by employing a statistical approach.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), Application-Specific Integrated Circuits (ASICs), Field Programmable Gate Arrays (FPGAs), or other media capable of storing computer readable media now known or later developed.

Overview

In most recommender systems, a recommendation is typically based on the ratings of items in one particular aspect according to a user's input and feedback. In other words, conventional recommender systems only use one utility model to compute the ratings of items. A utility model, also referred to as a "model" in this description, is a model which can be applied to an item to generate a utility value, or rating, for that item, which can then be used to make recommendations. A commonly used utility model is "collaborative filtering," where statistical techniques such as "nearest-neighbor computation" are used to group users and items into similar profiled groups. Given a user and an item he has not rated, the recommender system uses the similarity model to predict a score for the item. The highest scored items are then recommended to the user.

Most, if not all, conventional recommender systems rely only on one utility model. In the case of collaborative filtering, prior improvements focused primarily on how to improve the computational accuracy of the similarity metric. Ontology is often used to group items into classes of a hierarchical structure. The rating of an item in a higher-level class can be used to infer the rating of a subclass when it cannot be determined directly due to insufficient information. If, for example, there is not enough information to rate how much a querying user would like Thai food, the recommender system can use information about the querying user and other users' experiences with Asian restaurants instead. However, although the accuracy of the collaborative filter model has been increasing, most recommender systems still rely exclusively on only one model.

Figure 1:
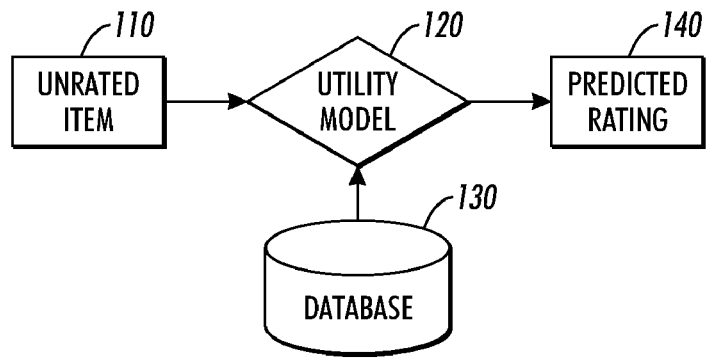
FIG. 1 illustrates an architecture diagram of a conventional single-model recommender system.

FIG. 1 illustrates an architecture diagram of a conventional single-model recommender system. A conventional recommender system includes a utility model 120 and a rating database 130.

During operation, the system receives an unrated item 110. The system then applies utility model 120 to unrated item 110 based on information stored in ratings database 130. For example, utility model 120 can be a collaborative filter model, and ratings database 130 can store information about similar items as well as user-profiling information. Based on the item 110, utility model 120, and information from ratings database 130, the system can compute a predicted rating 140 for the item.

Recommender System with Ad-hoc, Dynamic Model Composition

Embodiments of the present invention provide a comprehensive recommender system that utilizes more than one utility model to compute the ratings of items. This recommender system includes a utility model database containing a set of utility models which can be dynamically updated according to the need of a querying entity, which can be a user or another computer system. After receiving an item, the recommender system selects a subset of utility models from the utility model database on a per-query basis, optionally based on the contextual and preferential information pertinent to the querying entity. The system further applies a weight function to the subset of the utility models to compute an overall score or rating for the item. Contextual information (e.g., spatial and temporal information) as well as preferential information (e.g., taste) are obtained from the querying entity. As a result, this recommender system is significantly more flexible and extensible than existing systems. Furthermore, application developers can plug in or remove models at will. The system can also be adaptable and evolve over time based on user behavior, a feature not available in existing systems.

In one embodiment, the comprehensive recommender system can adaptively adjust the weight of each utility model in the weight function according to the contextual and preferential information about the querying entity. As a result, the accuracy of the rating is greatly improved. In addition, the recommender system retains the information about the user's behavior after the recommendation is made and is thus able to adapt to changes in user behavior to better predict his or her preferences in the future.

Note that the system can select an arbitrary number of models from the model database, and the selection of models can depend on the type of item to be rated, and/or characteristics of the querying entity. The selection of models can be performed in an ad-hoc or dynamic fashion, depending on inputs from the user and/or inputs from other modules of the system. The way models are combined can be specified in a set of rules, or can be inferred from the current user's context. It is also possible that the system can learn over time which models are more appropriate for which user in a given context.

Figure 2:
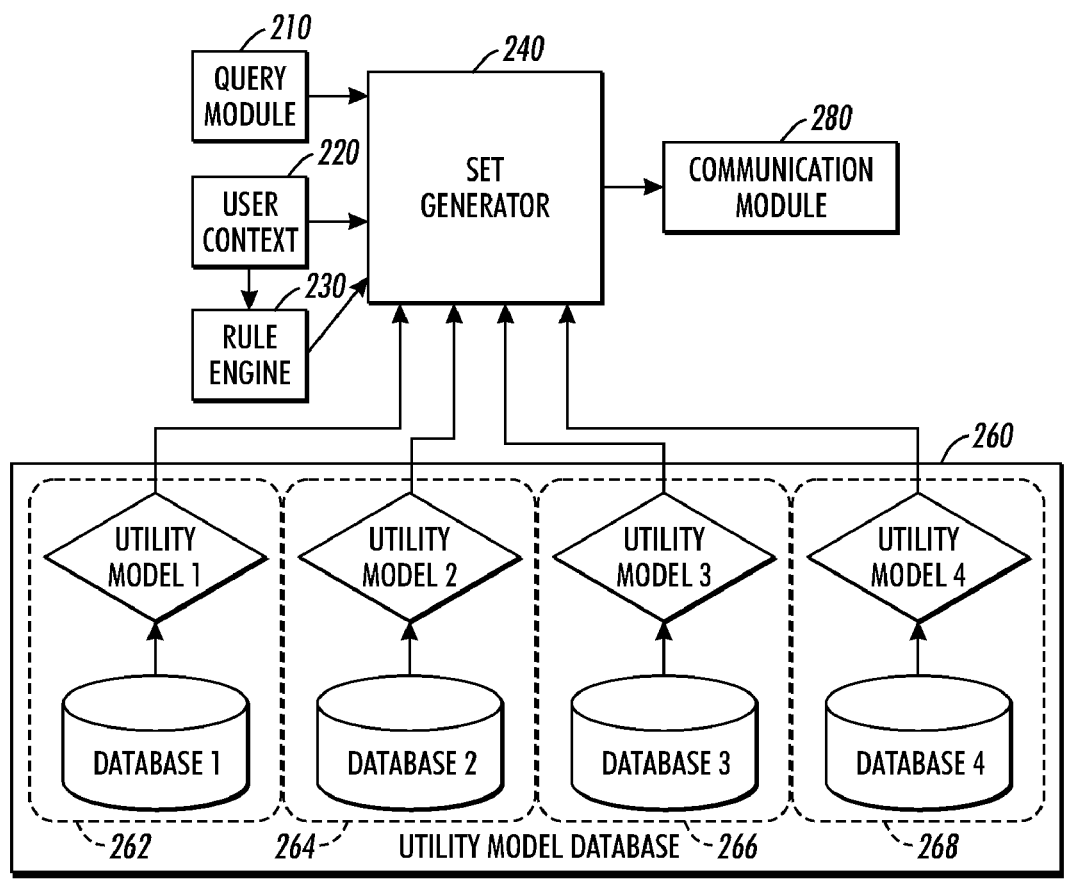
FIG. 2 illustrates an exemplary architecture for a recommender system that facilitates ad-hoc, dynamic model composition in accordance with one embodiment of the present invention.

FIG. 2 illustrates an exemplary architecture for a recommender system that facilitates ad-hoc, dynamic model composition in accordance with one embodiment of the present invention. A recommender system 200 comprises a query module 210, a user context module 220, a rule engine 230, a set generator 240, a utility model database 260, and a communication module 280.

After query module 210 receives an unrated item, rule engine 230 can dynamically select a subset of utility models from utility model database 260 based on information obtained from user context module 220. In one embodiment, user context module 220 can obtain a variety of user context information, such as the current time, weather condition, the user's location, the user's movements, a calendar entry reflecting a user's past, current, and/or future schedule; a set of messaging data comprised of text extracted from, among others, emails and/or instant messages, where one or more users discuss interests and/or plans; and a reading history which involves content extracted from web pages or other sources a user has accessed, which content reflects the user's interests and/or tastes. Other environmental, social, and behavioral parameters can also be included in the user context information.

Rule engine 230 generates a weight function of the subset of utility models which is used to compute the ratings of items in that particular category. In one embodiment, the weight of each utility model can be dynamically determined based on contextual and preferential information obtained from user context module 220. Note that the preferential information can be associated with any aspect of an item type. For example, it could be a film genre, a type of books, a type of cuisine, a music genre, and so on.

Utility model database 260 contains a set of utility models 262-268. Each utility model can be applied to an item in order to rate that item. For example, in order to decide which book a bookstore should recommend to a user, a collaborative filtering model collects information about the user, fits the user to a group profile, and recommend the books also purchased by other members of the same profile group. By using statistical information of the books and users dynamically collected in the past, the collaborative filtering model computes the ratings of books and recommends a set of books with the highest rating to the querying user. Aside from collaborative filtering, other utility models can also be included in the utility model database. Such models include, but are not limited to, user preference models which indicate a user's preferences, user contextual-information models which account for environmental parameters associated with a user, or any explicit of implicit models that take into consideration information associated with or provided by the user. Note that, as shown in FIG. 2, each utility model may also include an associated database which stores pertinent data to be used by the respective model.

Set generator 220 selects a set of utility models and the associated databases associated. For example, a rating database can be associated with a collaborative filtering model, while a cost function database can be associated with a user preference model. In addition, a content preference database can be associated with a content-preference utility model which evaluates an item's rating based on contents of a user's past behaviors, such as web-search or email keywords.

Set generator 220 generates the weighted ratings for an item by employing a predetermined formula using the weight function specified by rule engine 230. Subsequently, communication module 280 returns the predicated rating for the item.

Figure 3:
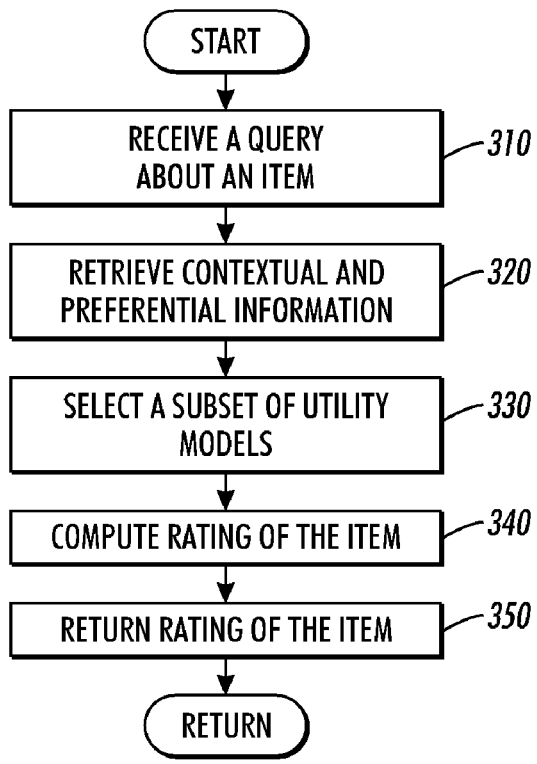
FIG. 3 presents a flow diagram illustrating an exemplary process of computing ratings for an item based on utility models in accordance with one embodiment of the present invention.

FIG. 3 presents a flow diagram illustrating an exemplary process of computing ratings for an item based on utility models in accordance with one embodiment of the present invention. During operation, a query module receives a query about an unrated item (operation 310). A rule engine then checks with the user context module and retrieves contextual and/or user preferential information about the querying entity (operation 320). After the retrieval of such information, the rule engine selects a subset of utility models from a utility model database and constructs a weight function of the selected utility models (operation 330). In one embodiment, the selection of the subset of utility models as well as the weight function of the selected utility models are dynamically determined based on the contextual and preferential information retrieved from the user context module on a per-query basis.

In addition, the rule engine can learn over time which utility models are most appropriate for a user in a given context by observing a user's actual selection of the recommended items. By associating the decision made by a user with the weight function used to generate the ratings, the learning mechanism of the rule engine can adjust the weight of each utility model dynamically.

In operation 340, the set generator computes an overall rating for the item by applying the weight function specified by the rule engine. A predetermined set of rules determines how the subset of models can be combined. A response containing the items with the highest rating is returned to the querying entity via a communication module in operation 350.

Figure 4:
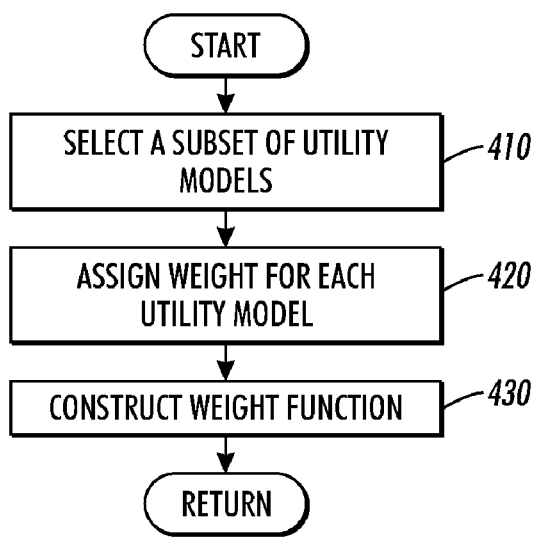
FIG. 4 presents a flow diagram illustrating an exemplary sequence of operations of a rule engine and a set generator in accordance with one embodiment of the present invention.

FIG. 4 presents a flow diagram illustrating an exemplary sequence of operations of a rule engine and a set generator in accordance with one embodiment of the present invention. During operation, the rule engine could be configured to select a specific subset of utility models to construct a weight function according to the type of the item indicated in the query. It could also employ statistical methods or heuristics to select the constituents of a weight function using the contextual and preferential information about the querying entity (operation 410). In one embodiment, the rule engine can use a Bayesian network or logistic regression to construct the weight function.

In one embodiment, the rule engine observes the behaviors of the user and selects the constituents of a weight function adaptively. For example, the user can submit a query for a suggestion on an activity for a particular occasion. Based on the information about the occasion, the rule engine selects two utility models—a collaborative filtering model and a soft query model. The collaborative filtering model computes the ratings of different activities by taking the preferences of a group of people while the soft query model computes the ratings of different activities based on the preferences provided by the user.

In operation 420, the rule engine determines the weight of each utility model by using contextual information associated with the query. For example, if the query is related to an activity for a group of people, the rule engine can assign a higher weight to the collaborative filtering model. If, however, the query is related to an activity for an individual, the rule engine can assign a higher weight to the soft query model.

In operation 430, the weight function of the two utility models is constructed using a machine learning mechanism, which extracts information from data automatically by computational and statistical methods. The set generator generates the different ratings for an item using the selected utility models separately. Subsequently, a weighted rating is computed by combining the ratings corresponding to each utility model.

Figure 5:
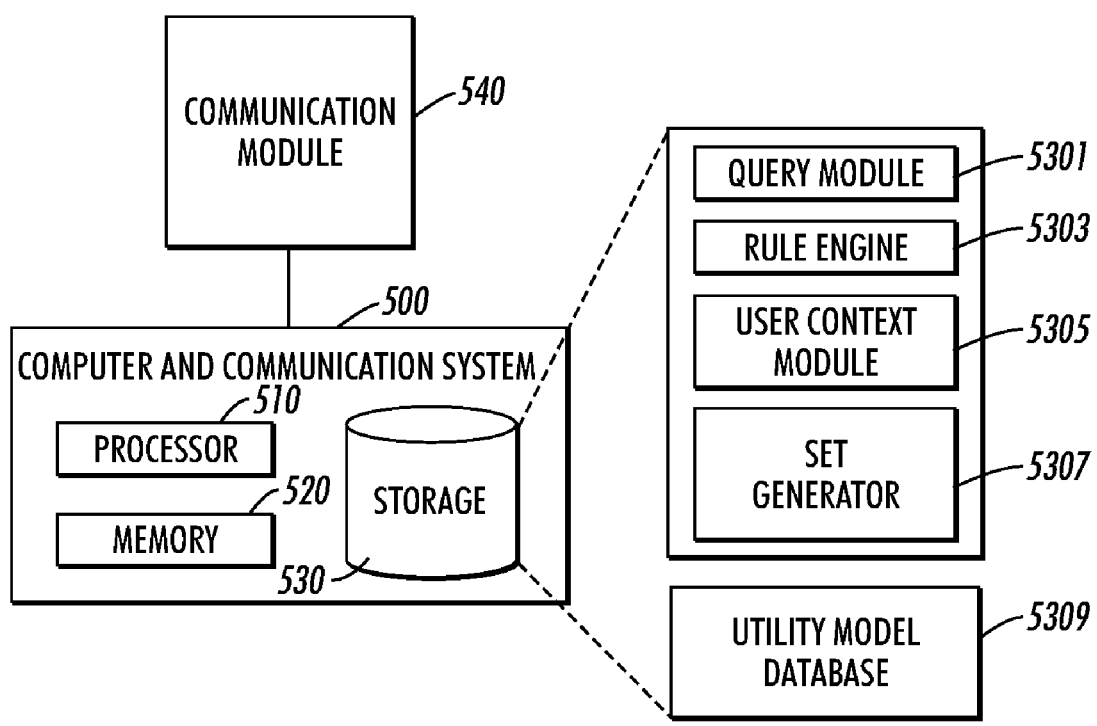
FIG. 5 illustrates an exemplary computer-based recommender system that facilitates ad-hoc, dynamic model composition in accordance with one embodiment of the present invention.

FIG. 5 illustrates an exemplary computer-based recommender system that facilitates ad-hoc, dynamic model composition in accordance with one embodiment of the present invention. A computer and communication system 500 includes a processor 510, a memory 520, a storage device 530, and a communication module 540. Storage device 530 stores applications, including a query module 532, a rule engine 532 which containing a user context module 536, a set generator 538, and a utility model database 540. During operation, all applications except utility model database 540 are loaded from storage device 530 into memory 520 and then executed by processor 510. While executing the applications, processor 510 performs one or more functions described above.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A recommender system for generating a recommendation of an item by combining a set of utility models adaptively to facilitate a decision-making process, the system comprising:

a utility model database containing the set of utility models;

a query module for receiving at a query about the item from a querying entity;

a rule engine to:
  specify two or more utility models to be applied to the item,
  determine a weight for each utility model, and
  specify a weight function of the utility models based in part on the determined weights;

a set generator to:
  compute a set of ratings by applying each utility model to the item, and
  generate an overall rating for the item based in part on the weight function; and a communication module to return the overall rating.

2. The recommender system of claim 1, wherein the rule engine includes a user context module to receive contextual and/or preferential information associated with the querying entity.

3. The recommender system of claim 2, wherein the contextual information includes at least one of:

a current time of day;
a current weather condition;
a location associated with the querying entity;
a movement associated with the querying entity;
a calendar entry reflecting a user's past, current, and/or future schedule;
a set of messaging data comprised of text extracted from, among others, emails and/or instant messages, where one or more users discuss interests and/or plans; and a reading history which involves content extracted from web pages or other sources a user has accessed, which content reflects the user's interests and/or tastes.

4. The recommender system of claim 1, wherein the rule engine selects the subset of utility models based on the contextual and/or preferential information received by the user context module.

5. The recommender system of claim 1, wherein the rule engine associates a decision made by the querying entity with the weight function to adjust the weight function adaptively.

6. The recommender system of claim 1, wherein the weight function of the specified utility models is constructed by employing a heuristic approach.

7. The recommender system of claim 1, wherein the weight function of the specified utility models is constructed by employing a statistical approach.

8. A method for generating a recommendation of an item by combining a set of utility models adaptively to facilitate a decision-making process, the method comprising:
    maintaining the set of utility models;
    receiving a query about the item from a querying entity;
    specifying two or more utility models to be applied to the item;
    determining a weight for each utility model;
    specifying a weight function of the utility models based in part on the determined weights;
    computing a set of ratings by applying each utility model to the item;
    generating an overall rating for the item based in part on the weight function; and
    returning the overall rating.

9. The method of claim 8, further comprising receiving contextual and/or preferential information associated with the querying entity.

10. The method of claim 9, wherein the contextual information includes at least one of:
    a current time of day;
    a current weather condition;
    a location associated with the querying entity;
    a movement associated with the querying entity;
    a calendar entry reflecting a user's past, current, and/or future schedule;
    a set of messaging data comprised of text extracted from, among others, emails and/or instant messages, where one or more users discuss interests and/or plans; and
    a reading history which involves content extracted from web pages or other sources a user has accessed, which content reflects the user's interests and/or tastes.

11. The method of claim 8,
    wherein specifying the subset of utility models comprises selecting the utility models based on the contextual and/or preferential information received by the user context module. .

12. The method of claim 8, further comprising associating a decision made by the querying entity with the weight function to adjust the weight function adaptively.

13. The method of claim 8, further comprising employing a heuristic approach to construct the weight function.

14. The method of claim 8, further comprising employing a statistical approach to construct the weight function.

15. A computer readable storage medium storing instructions which when executed by a computer cause the computer to perform a method for generating a recommendation of an item by combining a set of utility models adaptively to facilitate a decision-making process, the method comprising:
    maintaining the set of utility models;
    receiving at least one query about the item from a querying entity;
    specifying two or more utility models to be applied to the item;
    determining a weight for each utility model;
    specifying a weight function of the specified utility models based in part on the determined weights;
    computing a set of ratings by applying each of the utility model to the item;
    generating an overall rating for the item based in part on the weight function; and
    returning the overall rating.

16. The computer readable storage medium of claim 15, wherein the method further comprises receiving contextual and/or preferential information associated with the querying entity.

17. The computer readable storage medium of claim 16, wherein the contextual information includes at least one of:
    a current time of day;
    a current weather condition;
    a location associated with the querying entity;
    a movement associated with the querying entity;
    a calendar entry reflecting a user's past, current, and/or future schedule;
    a set of messaging data comprised of text extracted from, among others, emails and/or instant messages, where one or more users discuss interests and/or plans; and
    a reading history which involves content extracted from web pages or other sources a user has accessed, which content reflects the user's interests and/or tastes.

18. The computer readable storage medium of claim 15, wherein specifying the subset of utility models comprises selecting the utility models based on the contextual and/or preferential information received by the user context module.

19. The computer readable storage medium of claim 15, wherein the method further comprises associating a decision made by the querying entity with the weight function to adjust the weight function adaptively.

20. The computer readable storage medium of claim 15, wherein the method further comprises employing a heuristic approach to construct the weight function.

21. The computer readable storage medium of claim 15, wherein the method further comprises employing a statistical approach to construct the weight function.

* * * * *